Nov. 29, 1966   E. W. STARKEY   3,288,435
TRAILER WITH MOTORIZED JACK ASSEMBLY
Filed June 17, 1964
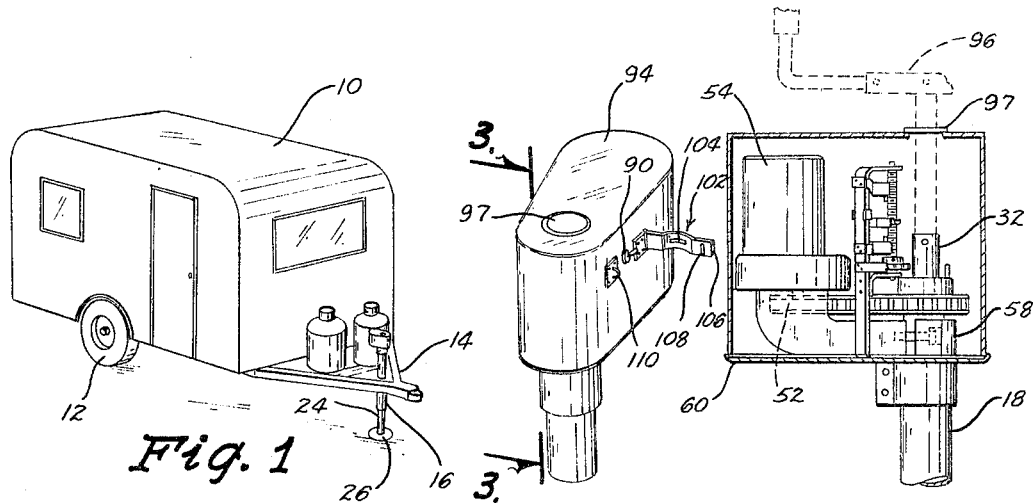
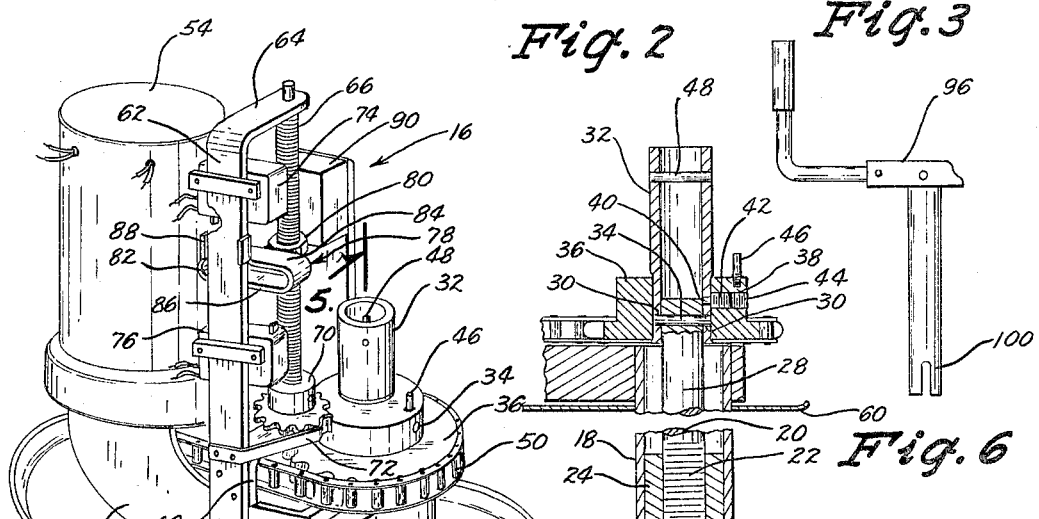
INVENTOR
ERNEST W. STARKEY
BY Dick & Zarley
ATTORNEYS

# United States Patent Office 3,288,435
Patented Nov. 29, 1966

3,288,435
TRAILER WITH MOTORIZED JACK ASSEMBLY
Ernest W. Starkey, 4107 E. Ninth St., Des Moines, Iowa
Filed June 17, 1964, Ser. No. 375,743
15 Claims. (Cl. 254—86)

This invention relates to a trailer and in particular to a trailer having a motorized jack for adjustably supporting the forward end when disengaged from another vehicle.

Heretofore, it has been necessary to manually operate any jack support used on trailers drawn behind automobiles or the like. Since trailers are frequently quite large and thus heavy, many turns of a crank are required to raise and lower the tongue of the trailer for connection to another vehicle. Accordingly, it is not uncommon to eliminate the manual raising and lowering operation by leaving the trailer in engagement with the forward vehicle in order to provide the required front end support for the trailer.

It is therefore one of the primary objects of this invention to provide a trailer having a tongue for detachable engagement to another vehicle wherein a motorized jack assembly is carried on the trailer tongue which may be quickly and easily operated to raise and lower the front end of the trailer relative to the pulling vehicle.

Another object of this invention is to provide a trailer having a motorized jack support for the forward end thereof wherein switch limiting means are provided to automatically stop the motor after the trailer has been lowered or raised to a predetermined position.

A still further object of this invention is to provide a trailer having a motorized jack support structure wherein a manually operable crank may be used to operate the jack assembly if desired.

A still further object of this invention is to provide a trailer having a motorized jack support assembly wherein a master control switch is provided which may be locked in an open position to prevent inadvertent operation of the jack.

A still further object of this invention is to provide a trailer having a jack assembly for supporting the forward end thereof wherein the jack assembly may be easily converted to a motorized system and still be manually operable if desired.

Yet another object of this invention is to provide a trailer having a motorized jack support assembly wherein the electrical power supply for the assembly is carried on the trailer vehicle and thus operates completely independent of any other external energy source.

A further object of this invention is to provide a trailer with a motorized jack assembly which is simple in design, economical to manufacture and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings, in which:

FIG. 1 is a perspective view of the trailer showing the jack assembly mounted on the tongue at the forward end thereof;

FIG. 2 is a perspective view of the power means for operating the jack assembly enclosed by a housing;

FIG. 3 is a cross-sectional elevational view taken along line 3—3 in FIG. 2;

FIG. 4 is a perspective view of the power apparatus for operating the jack assembly, the housing top portion having been removed for purposes of clarity of illustration;

FIG. 5 is a cross-sectional fragmentary elevational view taken along line 5—5 in FIG. 4;

FIG. 6 is a side elevation view of the crank which may be used to manually operate the jack assembly;

FIG. 7 is a reduced in scale side elevation view of the limit switch assembly for stopping the motor after the jack has been raised or lowered to a predetermined position; and FIG. 8 is an electrical schematic drawing of the electrical circuitry employed in the motorized jack structure.

A camping or house trailer 10 is shown in FIG. 1 having a pair of rear wheels 12 and a tongue frame assembly 14 on the forward end thereof. Fixedly secured to the tongue 14 is a jack assembly 16 for supporting the forward end of the trailer 10 when disengaged from an automobile (not shown) or the like. The jack assembly 16 as shown in FIG. 5 includes an outer tubular housing 18 in which an inner tube shaft member 20 is rotatably secured and limited against longitudinal vertical movement relative to the outer housing 18 by any conventional means. Screw threads 22 are provided on the inner shaft member 20 and engage an internally threaded second tube shaft member 24 which is adapted to move longitudinally of the inner shaft member 20 as it is rotated. Thus it is seen that the inner tube shaft member 20 and outer tube shaft member 24 are in telescoping engagement with each other.

In FIG. 1, a base support member 26 is shown connected to the outer tubular shaft member 24. The upper free end 28 of the inner tubular shaft 20 is provided with a diametrical hole which is in alignment with a pair of holes 30 formed in the lower end of a sleeve member 32 telescopingly embracing the upper end portion 28. A pin 34 is received in the hole in the inner tubular shaft portion 28 and the holes 30 in the sleeve 32 to prevent relative rotation therebetween. A sprocket wheel 36 is mounted on the sleeve 32 and is provided with a set screw opening 38 which is in alignment with an opening 40 in the sidewall of the sleeve 32. A set screw 42 having a reduced in diameter end portion is threaded into the hole 38 for the reduced in diameter end portion to extend into the hole 40. A second set screw 44 is provided in the set screw opening 38 to bear against the set screw 42 to prevent its accidental rotation and disengagement from the hole 40 in the sleeve 32.

Near the outer peripheral edge of the hub of the sprocket 36 is a vertically disposed pin 46. Also a horizontally disposed pin 48 extends diametrically across the upper end of the sleeve 32.

As shown in FIG. 4 an endless drive chain 50 extends around the sprocket 36 and is connected to a sprocket 52 on the lower end of a motor 54. The motor 54 is secured to the housing 18 by a frame member 56 which is clamped to the housing 18 by a clamp member 58. Adjustable bolts 60 interconnect the clamp member 58 to the motor support frame 56. A supporting enclosure platform 60 is provided on the housing 18 under the frame 56 and associated equipment.

A second frame member 62 which is U-shaped is vertically disposed in parallel relationship to the longitudinal axis of the shaft member 28 and has its lower free end 62 secured to the motor frame 56. The upper leg portion 64 of the frame 62 rotatably receives one end of a threaded shaft 66 which has its other end rotatably mounted in engagement with a bracket 68 secured to the frame member 62 adjacent the sprocket 36.

A sprocket 70 is fixedly secured to the lower end of the threaded shaft 66 and yieldingly engages a spring member 72 secured to the frame 62. A pair of micro switches 74 and 76 are mounted in spaced vertical relationship on the frame member 62 horizontally opposite the threaded shaft 66. An actuating member 78 is threadably mounted on the threaded shaft 66 for movement up and down relative thereto. The actuating member 78 includes a nut element 80 which is connected to a switch actuating element 82 having an upper portion 84 and a lower portion 86 for engagement with the switches 74 and 76 respectively. A U-shaped guide element 88 is mounted on the switch engaging portion 84 for slidable embracing engagement with the frame 62 to prevent rotation of the actuating assembly 78 relative to the threaded shaft 66.

A master control switch 90 is provided for operation of the motor 54 and is shown in the schematic drawing of FIG. 8 as being a three pole double throw toggle-type switch. A battery 92 located on the trailer 10 is provided for operation of the motor 54 through the switch 90 and switches 74 and 76 which are normally closed.

The jack assembly 16 is completed by a top housing 94 which matingly engages the lower housing member 60 to completely enclose the aforementioned components for operating the jack assembly 16. As seen in FIG. 2, a detachable cap 97 is provided in the top wall of the housing 94 in alignment with the longitudinal axis of the sleeve 32. Thus, the conventional crank 96 illustrated in FIG. 6 may be inserted through the opening in the housing 94 and engage the pin 48 by the slotted end portion 100.

To prevent inadvertent operation of the toggle switch 90, a switch lock bracket member 102 is provided hingedly connected to the sidewall of the housing 94 adjacent the switch 90 wherein the toggle portion of the switch is received through an elongated opening 104 which prevents the toggle portion from moving vertically between its two operative positions as illustrated in FIG. 8. The free end 106 of the switch lock bracket 102 is formed with opening 108 for receiving a lock ring 110. A lock or the like may be secured to the lock ring 110 to hold the switch lock bracket 102 in place thereby preventing operation of the toggle switch 90.

In operation it is seen that the switch 90 when moved to either its up or down position as illustrated in FIG. 8 will cause the motor 54 to be energized as long as the normally closed switches 74 and 76 remain closed. The motor 54 turns the sprocket 36 through the drive chain 50 and thereby causes the inner shaft member 28 to rotate since it is connected by the pin 34 to the sleeve 32 which is in turn connected by the set screw 42 to the sprocket 36. As the inner shaft 28 rotates in its fixed vertical position relative to the tongue 14, it causes the outer telescoping threaded member 24 to move up and down thereby raising or lowering the front end of the trailer 10.

As the sprocket 36 rotates the pin 46 engages a tooth on the sprocket 70 carried by the threaded shaft 66 and thereby causes it to rotate against the spring action of the spring 72 in yielding engagement with the teeth of the sprocket 70. As the sprocket 70 rotates the actuating member 78 is moved up and down along the threaded shaft 66 until it engages either of the mirco switches 74 or 76 thereby opening electrical circuit through the motor 54 and stopping the same. Once the motor 54 has been stopped, the main switch 90 must be moved to its opposite position thereby reversing the polarity of the motor 54 and making a circuit through the other micro switch which is at that time closed. The motor 54 will then continue to operate until the other mirco switch has moved to the extreme opposite vertical position in engagement with the other mirco switch thereby opening it and stopping the motor 54. It is apparent that the spacing of the micro switches 74 and 76 may be varied as desired as well as the number of threads per inch on the threaded shaft 66. Moreover the number of teeth on the sprocket 70 may be varied as well as the location of the pin 46 along the diameter of the sprocket 36 to provide the desired number of turns of the shaft 66 whereby the limiting micro switches 74 and 76 will be opened at the appropriate time as when the tongue 14 has been raised or lowered to its desired position.

It is to be appreciated that positive locking engagement with the inner shaft 28 is provided by the simplified connecting arrangement illustrated in FIG. 5 wherein the pin 34 actually floats between the inner sidewalls of the sprocket 36 and may be removed only upon removal of the sprocket 36 from the sleeve 32. Moreover the set screw 42 is novel in construction in its having a reduced in diameter end portion for insertion into the hole 40 in the sleeve 32. The set screw 42 cannot possibly be dislocated since a second set screw 44 is provided to prevent its rotation.

Some changes may be made in the construction and arrangement of my trailer with motorized jack assembly without departing from the real spirit and purpose of my invention, and it is my intention to cover by my claims, and modified forms of structure or use of mechanical equivalents which may be reasonably included within their scope.

I claim:

1. In a trailer type vehicle having a tongue supporting one end of said trailer and adapted to be connected to another vehicle, a jack assembly integrally connected to said tongue for supporting said tongue when disengaged from said other vehicle, said jack assembly including a first member threadably engaging in telescoping relationship a second member, said second member adapted to move longitudinally vertically relative to said first member and said tongue upon said first member being rotated, said second member disposed with its outer end opposite said first member extending downwardly, and the outer end of said first member opposite said second member extending upwardly, a battery operated motor mounted on said tongue adjacent said first member and means rotatably coupling said motor to said first member to extend and retract said second member relative to said first member thereby raising and lowering said trailer tongue, an electrical circuit including a power supply on said trailer for operating said motor and a switch means for reversing the polarity of said motor to provide for its rotation in opposite directions to lower and raise said tongue, second and third switch means in said electrical circuit being normally closed, switch actuating means having a member movably mounted on a threadable shaft and powered by said first member for movement in opposite directions along said threaded shaft, said switch actuating means adapted to move back and forth on said threaded shaft to alternately engage said second and third switches to open said second and third switches upon said first member having rotated a predetermined number of revolutions thereby opening said electrical circuit and stopping said motor until said switch means is again actuated to reverse the polarity through said motor.

2. In a trailer type vehicle having a tongue supporting one end of said trailer and adapted to be connected to another vehicle, a jack assembly integrally connected to said tongue for supporting said tongue when disengaged from said other vehicle, said jack assembly including a first member threadably engaging in telescoping relationship a second member, said second member adapted to move longitudinally vertically relative to said first member and said tongue upon said first member being rotated, said second member disposed with its outer end opposite said first member extending downwardly, and the outer end of said first member opposite said second member extending upwardly above said tongue, a motor mounted on said tongue adjacent the outer end of said first member and means rotatably coupling said motor to the outer end of said first member to extend and retract said second member relative to said first member thereby raising and lowering said trailer tongue, an electrical circuit including a power supply on said trailer for operating said motor and a switch means for reversing the polarity of said motor to provide for its rotation in opposite directions to lower and raise said tongue, a frame member secured in a vertical position to said tongue adjacent said first member, a pair of switches in said circuit and mounted in spaced vertical relationship on said frame member, said switches being normally closed, a threaded shaft disposed in a vertical position adjacent said frame member, a switch actuating member threadably engaging said threaded shaft and adapted to move upwardly and downwardly between said pair of switches, said actuating member positioned to open either of said pair of switches upon engagement therewith and thereby open said electrical circuit and stopping said motor, and means connected to said first member to rotate said threaded member as said first member is rotated.

3. In a trailer type vehicle having a tongue supporting one end of said trailer and adapted to be connected to another vehicle, a jack assembly integrally connected to said tongue for supporting said tongue when disengaged from said other vehicle, said jack assembly including a first member threadably engaging in telescoping relationship a second member, said second member adapted to move longitudinally vertically relative to said first member and said tongue upon said first member being rotated, said second member disposed with its outer end opposite said first member extending downwardly, and the outer end of said first member opposite said second member extending upwardly above said tongue, a motor mounted on said tongue adjacent the outer end of said first member and means rotatably coupling said motor to the outer end of said first member to extend and retract said second member relative to said first member thereby raising and lowering said trailer tongue, an electrical circuit including a power supply on said trailer for operating said motor and a switch means for reversing the polarity of said motor to provide for its rotation in opposite directions to lower and raise said tongue, a frame member secured in a vertical position to said tongue adjacent said first member, a pair of switches in said circuit and mounted in spaced vertical relationship on said frame member, said switches being normally closed, a threaded shaft disposed in a vertical position adjacent said frame member, a switch actuating member threadably engaging said threaded shaft and adapted to move upwardly and downwardly between said pair of switches, said actuating member positioned to open either of said pair of switches upon engagement therewith and thereby open said electrical circuit and stopping said motor, a sprocket fixedly secured to said threaded shaft, pin means positioned on said first member radially outwardly of the longitudinal center axis of said first member, and said pin means further being positioned to engage a tooth on said sprocket to rotate said sprocket a predetermined distance each revolution of said first member, and said threaded shaft being disposed in parallel relationship to said first member.

4. The structure of claim 3 wherein said actuating member has a guide portion slidably embracing said frame member to prevent rotation of said actuating member relative to said threaded member.

5. The structure of claim 3 and a spring arm secured to said frame and is so positioned that its outer free end yieldingly engages the teeth of said sprocket.

6. The structure of claim 3 and a housing enclosing said motor, said frame and the outer end of said first member, said housing having an opening in the top side thereof in alignment with the outer free end of said first member, a detachable cap adapted to close said opening and a crank member adapted to extend through said opening when said cap is removed and engage said outer end of said first member to permit manual operation of said jack assembly.

7. The structure of claim 3 and a housing enclosing said motor, said frame and the outer end of said first member, and said switch means having a manually operable lever extending through a side wall of said housing, a bracket member hingedly connected to said housing and having an opening formed therein to receive said switch lever to limit its movement, and a latch means on said housing for lockingly engaging the free end of said bracket member.

8. In a trailer type vehicle having a tongue supporting one end of said trailer and adapted to be connected to another vehicle, a jack assembly integrally connected to said tongue for supporting said tongue when disengaged from said other vehicle, said jack assembly including a first member threadably engaging in telescoping relationship a second member, said second member adapted to move longitudinally vertically relative to said first member and said tongue upon said first member being rotated, said second member disposed with its outer end opposite said first member extending downwardly, and the outer end of said first member opposite said second member extending upwardly, a motor mounted on said tongue adjacent said first member, a sleeve member in telescoping engagement with said outer end of said first member, said sleeve member and said outer end of said first member having a diametrical opening formed therethrough and a pin received therein to prevent relative rotation therebetween, and a wheel on said sleeve closing said opening in said sleeve thereby preventing removal of said pin from said sleeve and said outer end of said first member, and means coupling said wheel to said sleeve to prevent relative rotation therebetween.

9. The structure of claim 8 wherein said means for coupling said wheel to said sleeve includes a hole formed in the sidewall of said sleeve and a hole formed in said wheel along a radial line, a set screw threadably received in said hole in said wheel, and said set screw having a reduced in diameter end portion for extending into said hole in said sleeve.

10. In a trailer type vehicle having a tongue supporting one end of said trailer and adapted to be connected to another vehicle, a jack assembly integrally connected to said tongue for supporting said tongue when disengaged from said other vehicle, said jack assembly including a first member threadably engaging in telescoping relationship a second member, said second member adapted to move longitudinally vertically relative to said first member and said tongue upon said first member being rotated, said second member disposed with its outer end opposite said first member extending downwardly, and the outer end of said first member opposite said second member extending upwardly, a motor mounted on said tongue adjacent said first member, a sleeve member in telescoping engagement with said outer end of said first member, said sleeve member and said outer end of said first member having a diametrical opening formed therethrough and a pin received therein to prevent relative rotation therebetween, and a wheel on said sleeve closing said opening in said sleeve thereby preventing removal of said pin from said sleeve and said outer end of said first member, and means coupling said wheel to said sleeve to prevent relative rotation therebetween, and a second set screw threadably engaging said hole in said wheel and bearing against said first set screw to hold it against movement relative to said wheel.

11. In a trailer type vehicle having a tongue supporting one end of said trailer and adapted to be connected to another vehicle, a jack assembly connected to said tongue for supporting said tongue when disengaged from said other vehicle, said jack assembly including a first member threadably engaging a second member, said second member adapted to move longitudinally vertically relative to said first member and said tongue upon the rotation of said first member, a motor mounted on said tongue adjacent said first member and means coupling said motor to said first member to extend and retract said second member relative to said first member thereby raising and lowering said trailer tongue, an electrical circuit for operating said motor and a switch means for reversing the polarity of said motor to provide for its selective rotation in opposite directions to raise or to lower said tongue, a pair of switches in said circuit and mounted in spaced relation on a frame member, said switches being normally closed, a threaded shaft mounted on said frame member, a switch actuating means having a member threadably engaging said threaded shaft and adapted to move in opposite directions along said threaded shaft, said switch actuating means positioned to open either of said pair of switches upon engagement therewith and thereby open said electrical circuit and stopping said motor, and means interconnecting said first member and said threaded member to rotate said threaded member as said first member is rotated.

12. In a trailer type vehicle having a tongue supporting one end of said trailer and adapted to be connected to another vehicle, a jack assembly connected to said tongue for supporting said tongue when disengaged from said other vehicle, said jack assembly including a first member threadably engaging a second member, said second member adapted to move longitudinally vertically relative to said first member and said tongue upon the rotation of said first member, a battery operated motor having mounting means detachably securing said motor to said jack assembly and a sprocket chain drive means coupling said motor to said first member to extend and retract said second member relative to said first member thereby raising and lowering said trailer tongue, an electrical circuit for operating said motor and a switch means for reversing the direction of rotation of said motor to provide for its selective rotation in opposite directions to raise or to lower said tongue, a pair of switches in said circuit and mounted in spaced relation on a frame member, said switches being normally closed, a threaded shaft mounted on said frame member, a switch actuating means having a member threadably engaging said threaded shaft and adapted to move in opposite directions along said threaded shaft, said switch actuating means positioned to open either of said pair of switches upon engagement therewith and thereby open said electrical circuit and stopping said motor, and means interconnecting said first member and said threaded member to rotate said threaded member as said first member is rotated.

13. The structure of claim 12 and said sprocket chain drive means includes a sprocket detachably mounted on said first member, a sleeve member telescopingly connected to said first member and extends through said sprocket member, a free floating pin means interconnecting said sleeve member to said first member, said free floating pin means limited against longitudinal movement by the inner sidewall of said sprocket member, means for selectively locking said sprocket member to said sleeve member.

14. The structure of claim 13 wherein the upper end of said first member, said motor, and said sleeve are positioned above said trailer tongue.

15. The structure of claim 14 and said mounting means includes a cylindrical housing and a pair of semicylindrical clamp members matingly embracing said housing.

References Cited by the Examiner
UNITED STATES PATENTS

| | | |
|---|---|---|
| 1,539,642 | 4/1925 | Burnside. |
| 1,811,629 | 6/1931 | Hott. |
| 2,851,250 | 9/1958 | Hansen _____ 254—86 |
| 2,954,963 | 10/1960 | Berg _____ 254—86 |
| 3,077,120 | 2/1963 | Viehweger _____ 74—354 |
| 3,117,766 | 1/1964 | Ketel _____ 254—86 |

WILLIAM FELDMAN, *Primary Examiner.*

OTHELL M. SIMPSON, *Examiner.*